United States Patent
Makita et al.

(10) Patent No.: US 7,665,365 B2
(45) Date of Patent: Feb. 23, 2010

(54) PRESSURE SENSOR AND ATTACHMENT STRUCTURE OF PRESSURE SENSOR

(75) Inventors: Michihiro Makita, Obu (JP); Keiji Horiba, Nishikasugai-gun (JP)

(73) Assignee: DENSO CORPORATION, Kariya (JP)

( * ) Notice: Subject to any disclaimer, the term of this patent is extended or adjusted under 35 U.S.C. 154(b) by 121 days.

(21) Appl. No.: 12/076,027

(22) Filed: Mar. 13, 2008

(65) Prior Publication Data

US 2008/0257053 A1    Oct. 23, 2008

(30) Foreign Application Priority Data

Apr. 19, 2007    (JP)    ............... 2007-110326

(51) Int. Cl.
     *G01L 7/08*    (2006.01)
(52) U.S. Cl. .......................... 73/715; 73/756
(58) Field of Classification Search ............ 73/715, 73/730, 756
     See application file for complete search history.

(56) References Cited

U.S. PATENT DOCUMENTS

| | | | |
|---|---|---|---|
| 5,436,202 A * | 7/1995 | Miura ................. | 228/102 |
| 5,627,321 A * | 5/1997 | Korhonen et al. ........ | 73/715 |
| 6,494,099 B1 | 12/2002 | Chikuan et al. | |
| 6,521,966 B1 * | 2/2003 | Ishio et al. ............ | 257/417 |
| 6,622,564 B2 | 9/2003 | Imai | |
| 7,021,148 B2 | 4/2006 | Kuhn et al. | |
| 7,121,144 B2 | 10/2006 | Onoda et al. | |
| 7,268,008 B2 * | 9/2007 | Tomisaka et al. ........ | 438/48 |
| 7,340,959 B2 * | 3/2008 | Sato ................... | 73/730 |
| 2007/0095145 A1 * | 5/2007 | Sato ................... | 73/716 |

FOREIGN PATENT DOCUMENTS

| | | |
|---|---|---|
| JP | U-05-036272 | 5/1993 |
| JP | A-H07-19676 | 1/1995 |
| JP | A-08-219595 | 8/1996 |
| JP | A-11-211593 | 8/1999 |
| JP | A-2002-156299 | 5/2002 |
| JP | A-2002-365155 | 12/2002 |

OTHER PUBLICATIONS

Notice of Reason for Refusal mailed on Apr. 21, 2009 from the Japanese Patent Office in the corresponding Japanese patent application No. 2007-110326 (with English translation).

* cited by examiner

*Primary Examiner*—Andre J Allen
(74) *Attorney, Agent, or Firm*—Posz Law Group, PLC

(57) ABSTRACT

A pressure sensor comprises: a case; a detection unit attached to one end of the case; a housing member coupled with the one end of the case, the housing member including a first connection member, a second connection member, a passage and a pressure introduction hole; and a diaphragm fixed to the housing member so as to cover the detection unit, wherein the passage connects the first connection member with the second connection member, the pressure introduction hole introduces a pressure of the cooling medium to the diaphragm, and the detection unit is capable of detecting the pressure of the cooling medium.

11 Claims, 7 Drawing Sheets

PRESSURE SENSOR AND ATTACHMENT STRUCTURE OF PRESSURE SENSOR

CROSS REFERENCE TO RELATED APPLICATION

The present application is based on Japanese Patent Application No. 2007-110326 filed on Apr. 19, 2007, the disclosure of which is incorporated herein by reference.

FIELD Of THE INVENTION

The present invention relates to a pressure sensor for detecting pressure of a cooling medium, and related to an attachment structure of the pressure sensor.

BACKGROUND OF THE INVENTION

Japanese Patent Application Publication No. 2005-221315, corresponding to U.S. Patent Application Publication No. 7121144 for instance, discloses a pressure sensor, a configuration of which is described as follows. A sensing member for sensing pressure is disposed on one end of a resin case which is combined with a housing unit made of metal. The housing unit includes a pressure medium introduction hole. The pressure medium introduction hole is used for introducing a pressure medium. The configuration of the pressure sensor causes the sensing member to detect a pressure of the pressure medium introduced through the pressure medium introduction hole.

A pressure sensor like the above-described pressure sensor is configured so that the pressure sensor is mounted to an installation block. The installation block is attached to a part of a pipe in which a cooling medium flows. FIGS. 11A and 11B illustrate a pressure sensor according to a related art, the pressure sensor being attachable to an installation block. A pressure sensor R1 according to the related art includes a case R10 made of resin and a housing unit made of metal. The housing unit includes a screw member R80 and a nut member R81. The pressure sensor R1 is mounted to an installation block R100 via an O ring R90 by screw fixation. The installation block R100 has a first connection member R51 and a second connection member R52. The first and second connection members R51, R52 are to be coupled with a pipe in which a cooling medium flows. The installation block further has a passage through which the first connection member R51 is communicated with the second connection member R52. In addition to the pressure sensor R1, a sight glass R60 and a charging valve R70 are to be mounted to the installation block R100 via the O-ring R90.

As described above: the installation block R100 is attached to a part of a pipe; the pressure sensor R1 having the case R10 is mounted to the installation block R100; and the case R10 is combined with the housing unit. In this case, there arises a problem that the number of parts and the number of man-hour requirement are large.

SUMMARY OF THE INVENTION

In view of the above-described problem, it is an object of the present invention to provide a pressure sensor and an attachment structure of the pressure sensor.

According to a first aspect of the present invention, a pressure sensor comprises: a case; a detection unit attached to one end of the case; a housing member having a first surface, a first connection member, a second connection member, a passage and a pressure introduction hole, wherein the first surface of the housing member is coupled with the one end of the case; and a diaphragm fixed to the housing member so as to cover the detection unit. The first and second connection members are connectable with a pipe in which a cooling medium flows. The passage connects the first connection member with the second connection member. The pressure introduction hole introduces a pressure of the cooling medium to the diaphragm from the passage. The detection unit is capable of detecting the pressure of the cooling medium introduced from the first and second connection members through the passage and the pressure introduction hole such that the pressure is applied to the diaphragm and transmitted to the detection unit.

According to the above pressure sensor, the housing member is coupled with the one end of the case. The housing member includes the first and second connection members, the passage and the pressure introduction hole. The first and second connection members are connectable with the pipe in which the cooling medium flows. The passage connects the first connection member with the second connection member. The pressure introduction hole introduces the pressure of the pressure medium to the diagram from the passage. The housing member functions as the housing unit and the installation block. The number of parts and the number of man-hour requirement are reducible.

According to a second aspect of the present invention, an attachment structure of a pressure sensor, the pressure sensor including a case and a detection unit attached to one end of the case, the attachment structure comprises: a passage member connectable with the one end of the case, the passage member including a first connection member, a second connection member, a passage and a pressure introduction hole, wherein the first and second connection members are connectable with a pipe in which a cooling medium flows, the passage connects the first connection member and the second connection member, and the pressure introduction hole connects the passage with a surface of the passage member; and a diaphragm fixed to the passage member for covering the detection unit in the pressure introduction hole. The case is directly attachable to the passage member such that the one end of the case is inserted into the pressure introduction hole. The diaphragm is capable of receiving a pressure of the cooling medium introduced from the first and second connection members through the passage and the pressure introduction hole.

According to the above attachment structure, the case is directly attachable to the passage member including the first and second connection members, the passage and the pressure introduction hole. The first and second connection members are connectable with the pipe in which the cooling medium flows. The passage connects the first connection member with the second connection member. The pressure introduction hole connects the passage with the surface of the passage member. The number of parts and the number of man-hour requirement are reducible.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

A pressure sensor S1 according to a first embodiment is mounted to a vehicle for instance and used for detecting pressure of a cooling medium in a pipe associated with an air conditioner of the vehicle.

Figure 1:
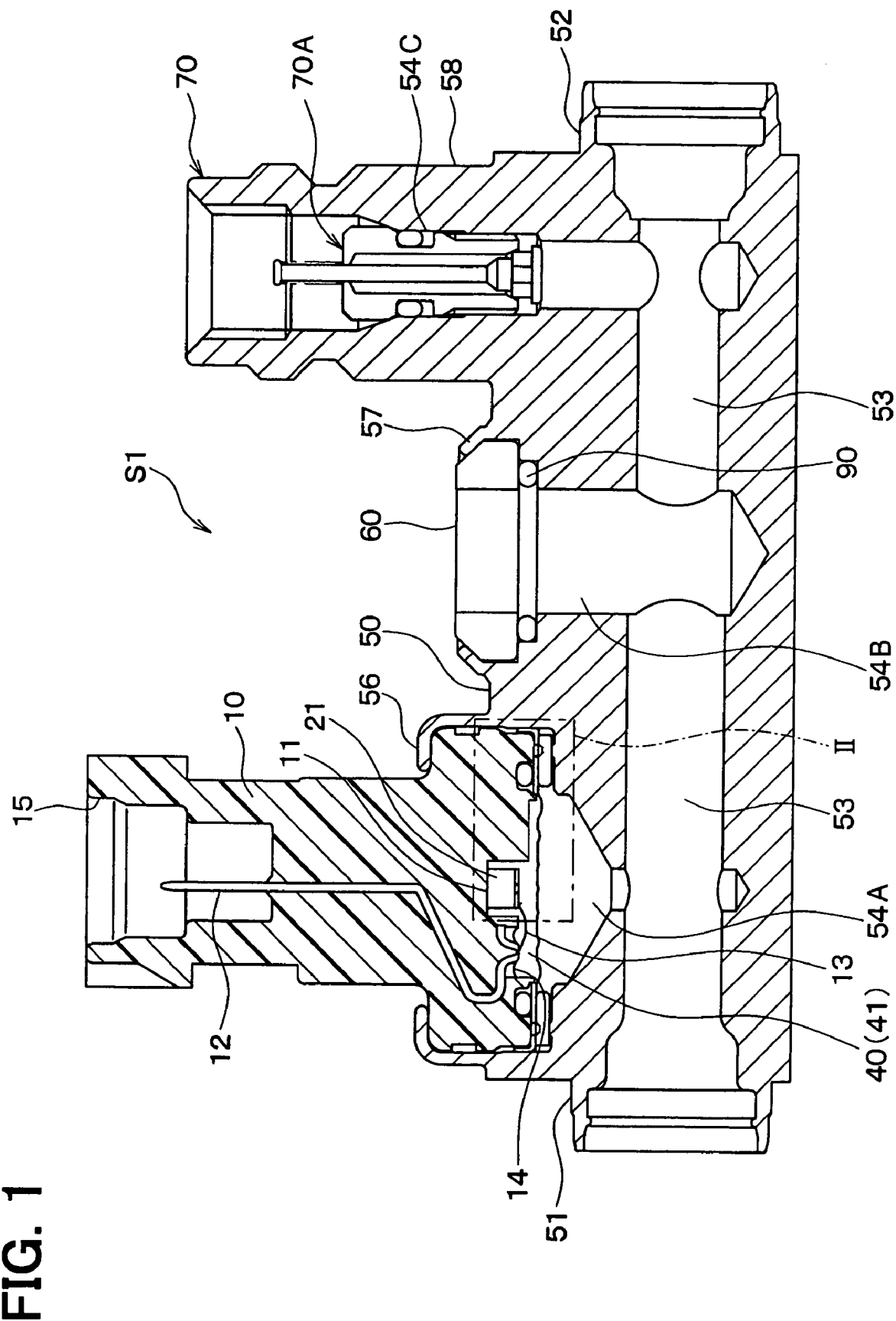
FIG. 1 is a cross sectional view of a pressure sensor according to a first embodiment of the present invention.

As shown FIG. 1, a connector case 10 has an almost cylindrical shape. The connector case 10 is made of, for example, resin such as Polyphenylene Sulfide (PPS) and Polyethylene Terephthalate (PBT). The connector case 10 may be formed by molding. A concave member 11 is disposed on one end of the connector case 10, corresponding to a bottom part in FIG. 1. The connector case 10 is an example of a case.

Figure 2:
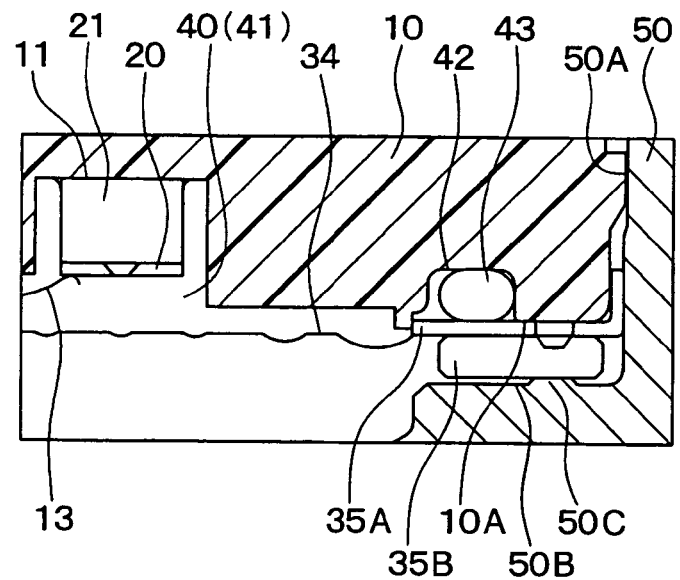
FIG. 2 is an enlarged view of a part of the pressure sensor, the part corresponding to a region II surrounded by dashed-dotted line in FIG. 1.

As shown in FIG. 2, a sensor element 20 for detecting pressure is disposed in the concave member 11. The sensor element 20 is an example of a detection unit The sensor element 20 includes a diaphragm at a surface of the sensor element 20. The diaphragm functions as a pressure receiving surface. A gauge resistor, which may be strain gauge resistor, is disposed on and formed on a surface of the diaphragm. The strain gauge resistor converts a received pressure into an electric signal. The sensor element 20 may be a semiconductor diaphragm typed element, and outputs an electric signal. The electric signal is referred to herein as a sensor signal.

The sensor element 20 is combined with a base member 21 by anodic bonding or the like. The base member 21 is made of, for example, glass. The base member 21 is bonded to the concave member 11, and thereby, the sensor element 20 is mounted to the connector case 10.

As shown in FIG. 1, a plurality of terminals 12 penetrates through the connector case 10 so that the sensor element 20 is electrically connectable with an external circuit. The plurality of terminals 12 may be made of metal and have a rod shape.

In the present embodiment, the plurality of terminals 12 is made of plated brass such as nickel plated brass for instance. The plurality of terminals 12 is combined with the connector case 10 by insert molding, and thereby, the plurality of terminals 12 is supported in the connector case 10.

One end of each terminal 12, which is illustrated in a bottom side of FIG. 1, is disposed so that the one end of each terminal 12 is stick-out from a bottom surface of the concave member 11 located around an area to which the sensor element 20 is mounted. The other end of each terminal 12, which is illustrated in a top side of FIG. 1, is exposed to an inside space of an opening member 15.

The one ends of each terminal 12, which is stick-out in the concave member 11, is electrically connected with the sensor element 20 by a bonding wire 13. The bonding wire 13 is made of, for example, gold, aluminum or the like.

As shown in FIG. 1, a sealing agent 14 is placed to base portions of the plurality of terminals 12, the base portions of the plurality of terminals 12 being exposed in the concave member 11. The sealing agent 14 is made of, for example, silicon resin or the like. The sealing agent 14 seals gap between the connector case 10 and the base portions of the terminals 12, the base portions being stick-out in the concave member 11.

As shown in FIG. 1, the connector case 10 has the opening member 15 at the other end of the connector case 10. A location of the opening member 15 corresponds to that illustrated in the top side of FIG. 1. The opening member 15 is configured to be a connector member for connecting between the other end of the connector case 10 and the external circuit through an external line member. The external line member, which is not shown, is a wire harness or the like for instance. The external circuit is, for example, an electronic control unit (ECU) of a vehicle or the like.

The connector member allows the other ends of the plurality of terminals 12 to be electrically connectable with the external circuit. Thus, a signal is capable of being transmitted and received between the sensor element 20 and the external circuit through the bonding wire 13 and the plurality of terminals 12.

A housing member 50 is attached to the one end of the connector case 10. In the present embodiment, the housing member 50 has functions which both of the housing unit made of resin and the installation block have, the housing unit and the installation block corresponding to that shown in FIGS. 11A and 11B.

The housing member 50 has an almost rectangular shape and made of, for example, metal material. A first connection member 51 is disposed and formed on a first surface of the housing member 50. The first connection member 51 is to be connected with the pipe in which the cooling medium flows. A second connection member 52 is disposed and formed on a second surface of the housing member. The fist surface of the housing member 50 is opposite to the second surface of the housing member 50. A passage 53 is disposed and formed in the housing member 50. The passage 53 connects the first connection member 51 and the second connection member 52. A pressure introduction hole 54A is disposed and formed in the housing member 50 so that the pressure introduction hole 54A connects between the passage 53 and a surface of the housing member 50. One end of the connector case 10 is inserted into the pressure introduction hole 54A, and the connector case 10 is mounted to the housing member 50.

As described above, the housing member 50 includes the first and second connection members 51, 52, the passage 53, and the pressure introduction hole 54A. The first and second connection members 51, 52 are to be connected with the pipe in which the cooling medium flows. The passage 53 connects the first connection member 51 with the second connection member 52. The pressure introduction hole 54A introduces a pressure of the cooling medium from the passage 53. The pressure of the cooling medium is applied to the diaphragm via the passage 53 and the pressure introduction hole 54A.

As shown in FIG. 2, a diaphragm 34, which is made of metal for instance, having a thin structure is placed between an apical surface 10A of the connector case 10 and a surface 50B of a concave container member 50A of the housing member 50 so that the diaphragm 34 is disposed between a ring weld member 35A and a ring plate 35B. The surface 50B is opposite to the apical surface 10A of the connector case 10. The ring weld member 35A is an example of a hold member. The ring plate 35B is thicker than the diaphragm 34. The elements described above are jointed with each other by welding.

A projection member 50C is formed on a portion of the surface 50B of the housing member 50. The ring plate 35B is disposed on the portion of the surface 50B of the housing member 50. The ring plate 35B is resistance welded almost all around to the projection member 50C, and accordingly, one end of the pressure introduction hole 54A is sealingly welded to the ring plate 35B.

As shown in FIG. 1, one end of the housing member 50, which is on the side of the concave container member 50A, is crimped at one end of the connector case 10, and thereby, a crimp member 56 is configured at the one end of the housing member 50. The housing member 50 is fixed to and combined with the connector case 10 by the crimp member 56.

In the connector case 10 and the housing member 50 which are combined with each other in the above-described manner, a pressure detection chamber 40 is configured between the diaphragm 34 of the housing member 50 and the concave member 11 of the connector case 10

The pressure detection chamber 40 is filled with and encloses an oil 41. The oil 41 may be a fluorine oil. The oil 41 functions as enclosed liquid and a pressure transmission medium. More specifically, the concave member 11 is filled with the oil 41 so that the oil 41 covers electric connection parts such as the sensor element 20, the bonding wire 13 and the like. The diaphragm 34 covers and seals the oil 41.

Since the pressure detection chamber 40 has the above-described configuration, the pressure introduced from the pressure introduction hole 54A is applied to the sensor element 20, the bonding wire 13 and the plurality of terminals 12 through the diaphragm 34 and the oil 41. The diaphragm 34 is made of metal for instance.

In the pressure sensor according to the present embodiment, a ditch 42 having a circular shape is formed and disposed on the apical surface 10A of the connector case 10 such that the ditch 42 surrounds a periphery of the pressure detection chamber 40. The ditch 42 corresponds to an O-ring ditch. An O-ring 43 is disposed in the ditch 42 in order to hermetically seal the pressure detection chamber 40.

The O-ring 43 is made of, for example, elastic material such as silicon rubber. The O-ring 43 is disposed between and pressed by the connector case 10 and the housing member 50, and thereby, the pressure detection chamber 40 is sealed and closed by the diaphragm 34 and the O-ring 43.

A surface of the housing member 50, the surface having the pressure introduction hole 54A, has an first opening member 54B for mounting a sight glass 60. The sight glass 60 is used for providing visualization of the cooling medium flowing in the passage 53. One end of the first opening member 54B is crimped at the sight glass 60, and thereby, a crimp member 57 is configured at the one end of the first opening member 54B. The sight glass 60 is fixed to and combined with the housing member 50 by the crimp member 57. An O-ring 90 is disposed between the first opening member 54B and the sight glass 60.

The surface of the housing member 50, the surface having the pressure introduction hole 54A, has an second opening the member 54C for mounting a valve core which is used for introducing and discharging the cooling medium. A valve core 70A is disposed in the second opening member 54C for mounting a valve core, and thereby, a charging valve 70 is configured. A projecting part 58 for accommodating the valve core is configured around the second opening member 54C. A top part of the projecting part 58 is configured so that a valve cap is capable of being mounted to the top part of the projecting part 58.

Figure 3:
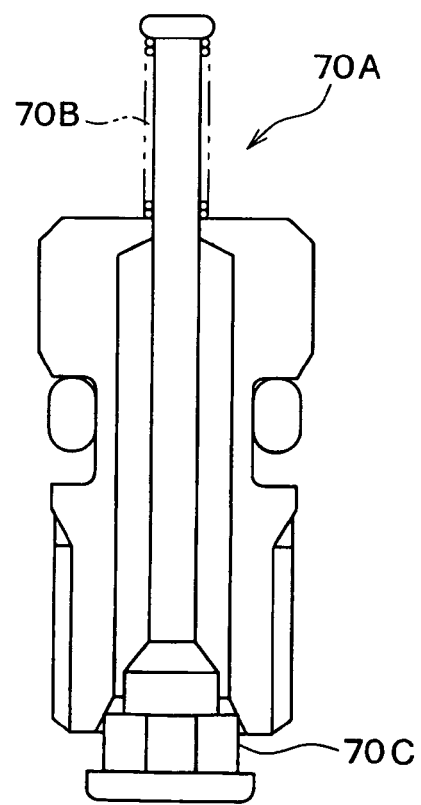
FIG. 3 is a cross sectional view of a valve core.

FIG. 3 illustrates a cross sectional view of the valve core 70A. The valve core 70A operates as follows. When a projecting member 70B is push down, a valve 70C is opened, and the valve core 70A provides a passage for introducing the cooling medium. When the valve core 70A is in a normal state, the valve is in a closed state, and the cooling medium is held and not discharged externally.

A method for manufacturing the pressure sensor S1 is described below.

Prepared is the connector case 10 into which the plurality of terminals 12 is inserted by insert molding. With using an adhesive agent, the sensor element 20 is joined with and fixed to the concave member 11 via the base member 21 so that the sensor element 20 is disposed in the concave member 11.

The sealing agent 14 is placed on the base portions of the plurality of terminals 12, the base portions being exposed to the inside space of the concave member 11. The amount of the sealing agent 14 to be placed is controlled so that the sealing agent is not attached to the sensor element 20.

The sealing agent 14 which has been placed is hardened. One end of each terminal 12 is electronically connected with the sensor element 20 with using the bonding wire 13 by wire bonding.

A predetermined amount of the oil 41 is poured on the concave member 11 with using, for example, a dispenser. The oil 41 may be made of fluorine oil. In pouring the oil 41, the connector case 10 may be placed so that the side of the sensor element 20 may be on vertically upper side, and the oil 41 may be poured from upper side.

The ring plate 35B is placed in the concave container member 50A of the housing member 50. A predetermined voltage is applied between the ring plate 35B and the housing member 50, and thereby, the ring plate 35B is welded to the projection member 50C by resistance welding so that the ring plate 35B is connected with the housing member 50.

The ring weld member 35A is placed on the ring plate 35B. The ring weld member 35A, the diaphragm 34 and the ring plate 35B are welded by, for example, laser welding from an upper surface side of the ring weld member 35A.

In addition to the connector case 10 in which the oil 41 has been poured, the housing member 50 as well as the diaphragm 34, the ring welt member 35A and the like are placed in a vacuum chamber with keeping them in a horizontal position. Extra air in the pressure detection chamber 40 is extracted by vacuuming.

Pressing force is applied so that the apical surface 10A of the connector case 10 is fully in contact with one surface 30B of the housing member 50, and thereby, the diaphragm 34 and the O-ring 43 seal the pressure detection chamber 40.

With using a special crimp tool, the connector case 10 and the sight glass 60 are installed to and fixed to the housing member 50 at one time by crimping. In the above-described manner, the connector case 10 and the sight glass 60 are installed to the housing member 50.

The valve core 70A is installed to the second opening member 54C formed in the housing member 50. The valve cap is disposed so as to cover the top of the projecting part 58. The pressure sensor S1 shown in FIG. 1 is configured. Note that the valve cap is not shown in FIG. 1 and the projecting part 58 is used for accommodating the valve core.

A pressure detection operation performed by the pressure sensor S1 is described below.

The pressure sensor S1 is coupled with a pipe via the first and second connection members. The cooling medium is introduced in the passage 63 through the valve core 70A. Pressure in the pipe is introduced in the pressure sensor S1 through the pressure introduction hole 54A of the housing member 50.

The introduced pressure is applied to the pressure receiving surface of the sensor element 20 through the diaphragm 34 and the oil 41 in the pressure detection chamber 40. The pressure receiving surface is disposed on the surface of the sensor element 20. The sensor element 20 outputs the electric signal as the sensor signal, including information associated with the applied pressure.

The sensor signal is transmitted to the external circuit via the bonding wire 13 and the plurality of terminals 12, and the pressure of the cooling medium in the pipe is detected or measured. In the above-described manner, the pressure sensor S1 performs the pressure detection operation.

According to the above-described configuration, the housing member mounted to the one side of the connector case includes the first and second connection members for being in communication with the pipe in which the cooling medium flows, the passage for connecting the first connection member with the second connection member, and the pressure introduction hole for introducing the pressure of the cooling medium from the passage to the diaphragm. Since functions of the housing member according to the present embodiment include both functions of the conventional housing unit and the conventional installation block, the number of parts and the number of man-hour requirement are reducible. According to the present embodiment, the elements corresponding to the housing unit and the installation block are combined without using the O-ring, and as a spin-off, there arises no occurrence of a seal defect due to a foreign body or a particle which is sandwiched at a time of assembling. Therefore, quality in an aspect of leakage of a cooling medium is improved in an air conditioner system.

Also, the sight glass is directly connectable with the first opening member formed on the housing member.

Also, since both of the sight glass and the connector case are attached to the same surface side of the housing member, the sight glass and the connector case are capable of being fixed to the housing member at one time by crimping with using a special tool.

Figure 11A:
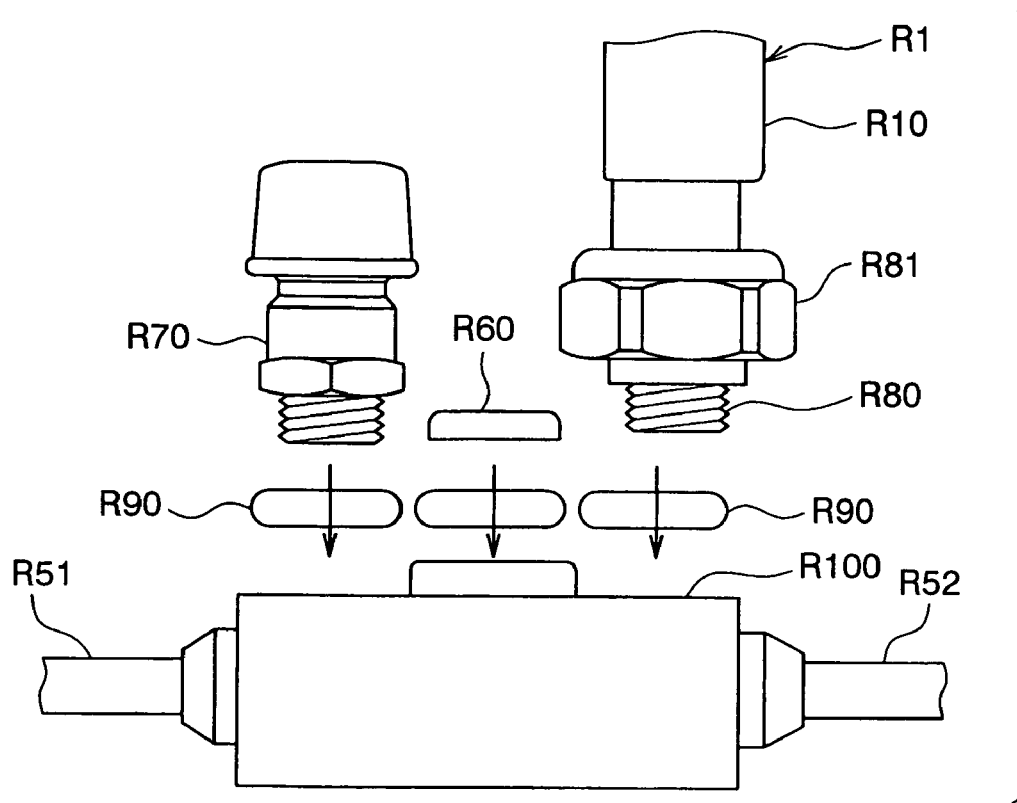
FIGS. 11A and 11B illustrate an attachment structure of a pressure sensor according to a related art.
Figure 11B:
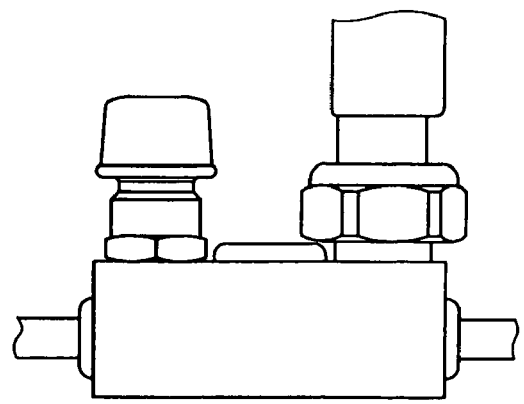

Also, as shown in FIGS. 11A and 11B, when the charging valve R70 separated from the housing unit is mounted to the housing unit, the O-ring R90 for ensuring air sealing is required. However, according to the present embodiment, without disposing the O-ring 90, it is possible to configure the charging valve by disposing the valve core in the second opening member of the housing member.

Also, since, the sight glass and the charging valve are, as described above, attached to the same surface side of the housing member or on the same plane, efficiency is improved in introducing a cooling medium.

In another aspect, the above-described configuration may be also descried as follows: the housing member 50 may be a passage member including the first and second connection members for having connection with the pipe in which the cooling medium flows; the passage causes the cooling medium to flow between the first and second connection members; the pressure introduction hole connects between the passage and the surface; and the passage member is directly connectable with the connector case 10. For the reason described above, the number of parts and the number of man-hour requirement are reducible.

Second Embodiment

Figure 4:
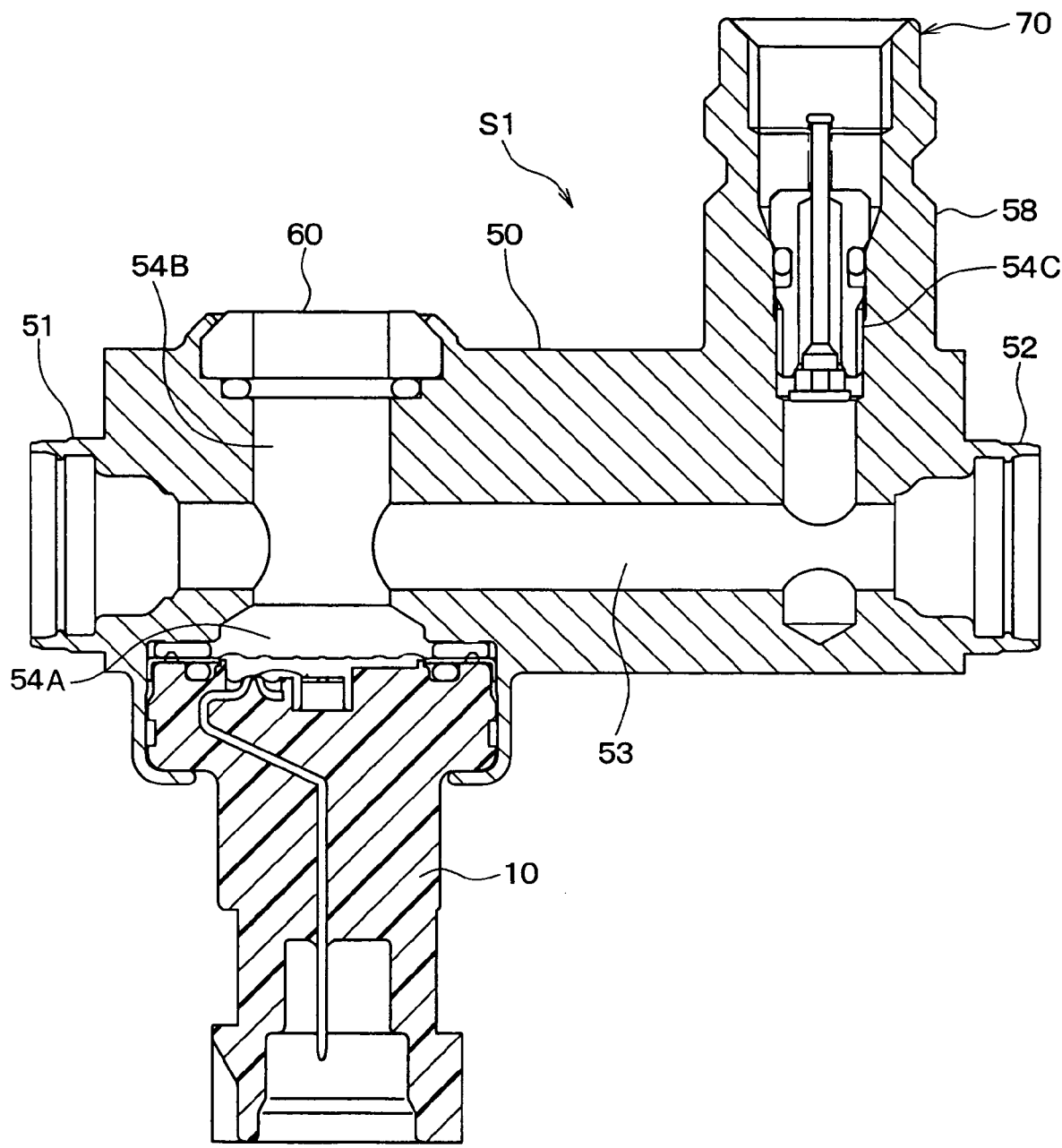
FIG. 4 is a cross sectional view of a pressure sensor according to a second embodiment of the present invention.

A pressure sensor according to a second embodiment is described below with reference to FIG. 4. In the first embodiment, the housing member 50 has an almost rectangular parallelepiped shape, and the sight glass 60 and the charging valve 70 are disposed on one surface of the housing member. However, in the present embodiment, a surface on which the connector case 10 is disposed is different from and opposite to a surface on which the sight glass 60 and the charging valve are disposed.

With using a special crimp tool, the connector case 10 and the sight glass 60 are installed to and fixed to the housing member 50 at one time. The valve core 70A is installed to the second opening member 54C formed in the housing member 50, and then, the valve cap is disposed so as to cover a top part of the projecting part 58, and the pressure sensor S1 is provided. Note that the valve cap is not shown in FIGS.

Since the sight glass is mounted to the surface which is opposite to the connector case, the connector case and the sight glass are capable of being fixed to the housing member at one time by crimping with using a special crimp tool.

If the sight glass, the charging valve and the connector case are disposed on one surface of the housing member in a line as is a case of a related art, the disposing surface would be long in the direction of the line. However, in the present embodiment, since the surface on which the connector case 10 is disposed is opposite to the surface on which the sight glass 60 and the charging valve are disposed, the length of a disposing surface in the direction of a line is reducible, and therefore, a dimension of the pressure sensor is reducible.

Third Embodiment

Figure 5:
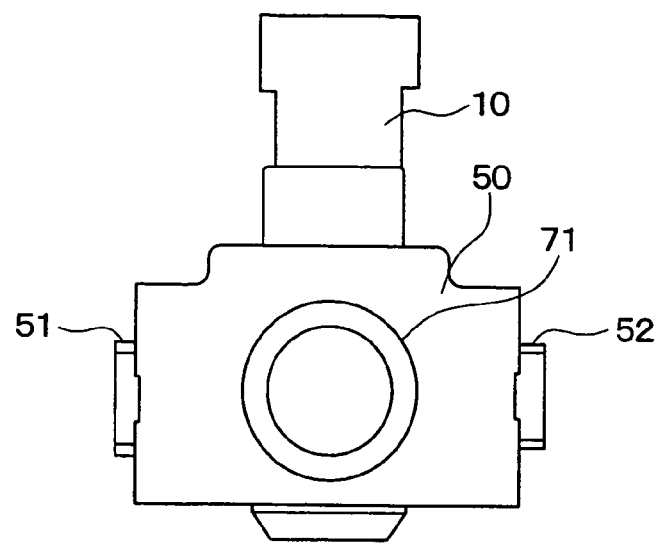
FIG. 5 is a front view of a pressure sensor according to a third embodiment of the present invention.

A pressure sensor S1 according to a third embodiment is described below with reference to FIG. 5. The pressure sensor S1 includes a housing member 50 having an almost rectangular parallelepiped shape. The first and second connection members 51, 52 are formed on surfaces which are opposite to each other, and which correspond to a left side surface and a right side surface of the housing member 50 illustrated in FIG. 5. The connector case 10 and the sight glass 60 are mounted to surfaces which are opposite to each other and which are different from the surfaces on which the first and second connection members 51, 52 are disposed. The surfaces on which the connector case 10 and the sight glass 60 are disposed correspond to an upper surface and a bottom surface of the housing member 50 illustrated in FIG. 5, respectively. Further, the charging valve 70, a location of which corresponds to the valve cap 71 in FIG. 5, is disposed on a surface which is almost perpendicular to the surfaces on which the first and second connection members are disposed. The surface on which the charging valve is disposed corresponds to a front face of the housing member 50 illustrated in FIG. 5.

In the pressure sensor S1 according to the present embodiment, the connector case. 10 and the sight glass 60 are disposed or formed on the surfaces of the housing member 50, which are opposite to each other, and which correspond to an upper surface and a bottom surface in FIG. 5. Therefore, with using a special crimp tool, the connector case 10 and the sight glass 60 can be fixed to the housing member 50 at one time by crimping.

Since the connector case 10, the sight glass 60, the first connection member 51, the second connection member 52 and the charging valve 70 are, respectively, disposed on different surfaces, a dimension of the pressure sensor S1 is reducible.

Fourth Embodiment

A pressure sensor according to a fourth embodiment is described below with reference to FIGS. 6A and 6B.

Figure 6A:
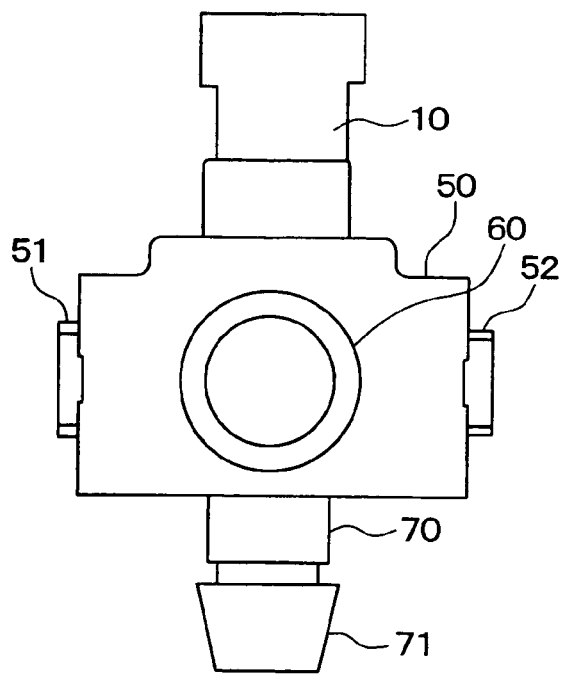
FIG. 6A is a front view of a pressure sensor according to a fourth embodiment of the present invention.
Figure 6B:
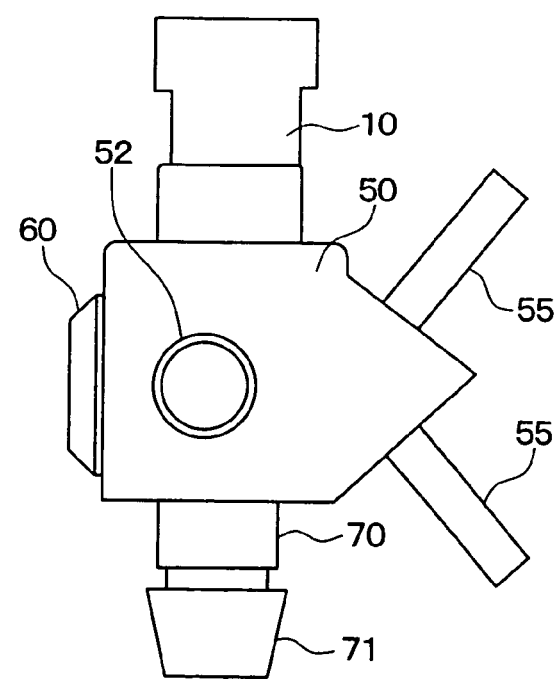
FIG. 6B is a side view of the pressure sensor according to the fourth embodiment of the present invention.

As shown in FIGS. 6A and 6B, a housing member 50 according to the present embodiment has a polyhedral shape such as a heptahedral shape for instance. The first connection member 51 and the second connection member 52 are, respectively, formed on a first surface and a second surface of the housing member 50. The first and second surfaces are opposite to each other. The first surface and the second surface, respectively, correspond to a left side surface and a right side surface of the housing member illustrated in FIG. 6. The connector case 10 and the charging valve 70 are, respectively, mounted to a third surface and a fourth surface. The third and fourth surfaces are different from the first and second surfaces, and opposite to each other. The third surface and the fourth surface, respectively, correspond to an upper side surface and a bottom side surface of the housing member illustrated in FIG. 6. Further, the sight glass 60 is mounted to a fifth surface of the housing member 50. The fifth surface is perpendicular to the first and second surfaces of the housing member on which the first and second connection members 51, 52 are disposed.

Also, as shown in FIG. 6B, a bracket 55 for fixation is disposed on a surface on which neither the connector case 10, the charging valve 70, the sight glass 60 and the first and second connection members 51, 52 are disposed. The bracket 55 for fixation is used when the pressure sensor S1 is mounted to a vehicle.

According to the above-described configuration, the connector case 10, the sight glass 60, the first connection member 51, the second connection member 52 and the charging valve 70 are disposed on different surfaces of the housing member 50 respectively. Therefore, a dimension of the pressure sensor is reducible.

Fifth Embodiment

Figure 7:
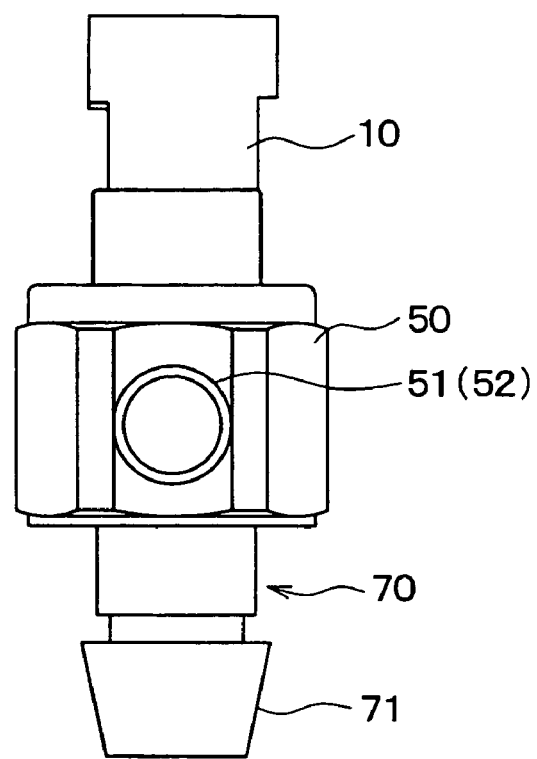
FIG. 7 is a front view of a pressure sensor according to a fifth embodiment of the present invention.

A pressure sensor according to a fifth embodiment is described below with reference to FIG. 7. A housing member 50 according to the present embodiment has an almost six-sided prism shape, similarly to a shape of the nut member 81 according to the related art shown in FIGS. 11A and 11B. The connector case 10 is disposed on a top surface of the housing member 50 and the charging valve 70 is disposed on a bottom surface of the housing member 50. The first and second connection members 51, 52 are, respectively, disposed on side surfaces, which are opposite to each other, of the housing member 50. Note that the pressure sensor S1 according to the present embodiment does not include the sight glass 60.

According to the above-described configuration, the connector case 10, the first connection member 51, the second connection member 52 and the charging valve 70 are disposed on different surfaces of the housing member 50, respectively. Therefore, a dimension of the pressure sensor is reducible.

Since the housing member 50 according to the present embodiment has almost the six-sided prism shape, similarly to the shape of the nut member 81 shown in FIGS. 11A and 11B, the pressure sensor according to the present embodiment is producible through a production line which is similar or identical to that for the pressure sensor according to the related art or the like.

Sixth Embodiment

Figure 8:
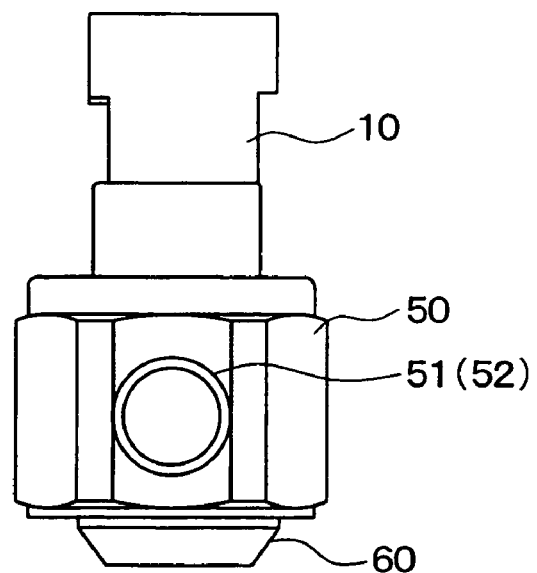
FIG. 8 is a front view of a pressure sensor according to a sixth embodiment of the present invention.

A pressure sensor according to a sixth embodiment is described below with reference to FIG. 8. A housing member 50 of the pressure sensor according to the sixth embodiment has an almost six-sided prism shape, similarly to a shape of that shown FIG. 7, and similarly to the shape of the nut member 81 shown in FIGS. 11A and 11B. The connector case 10 is disposed on a top surface of the housing member 50. The first and second connection members 51, 52 are, respectively, disposed on side surfaces, which are opposite to each other, of the housing member 50. The sight glass 60 other than the charging valve 70 is disposed on a bottom surface of the housing member 50.

According to the above-described configuration, the connector case 10, the sight glass 60, the first connection member 51 and the second connection member 52 are disposed on different surfaces of the housing member 50, respectively. Therefore, a dimension of the pressure sensor is reducible.

Seventh Embodiment

Figure 9:
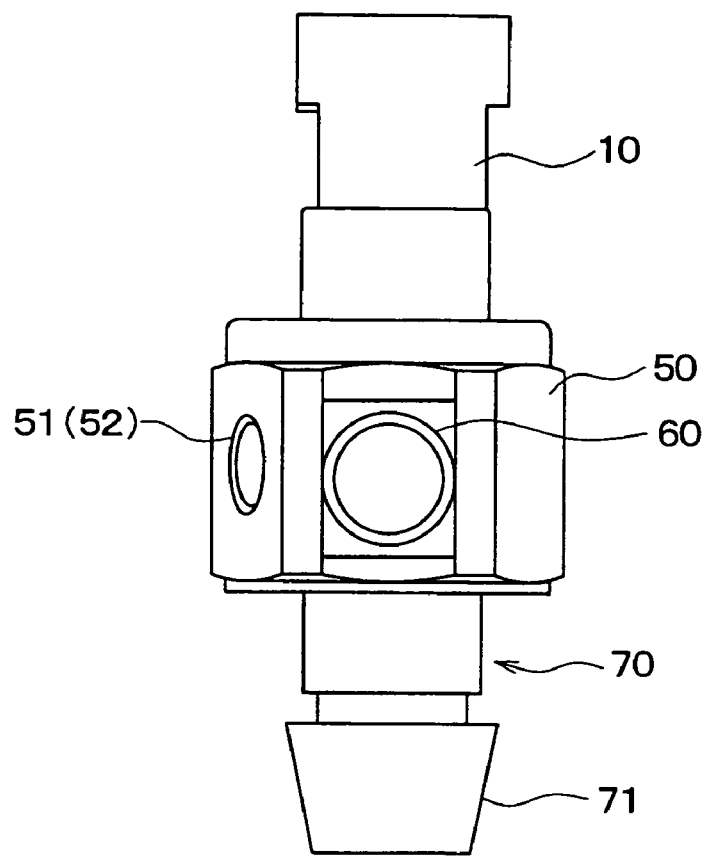
FIG. 9 is a front view of a pressure sensor according to a seventh embodiment of the present invention.

A pressure sensor according to a seventh embodiment is described below with reference to FIG. 9. A housing member 50 of the pressure sensor according to the seventh has an almost six-sided prism shape, similarly to the shape of that shown in FIGS. 7 and 8, and similarly to the shape of the nut member 81 according to the related art shown in FIGS. 11A and 11B. The connector case 10 is disposed on a top surface of the housing member 50. The charging valve 70 is disposed on a bottom surface of the housing member 50. The first and second connection members 51, 52 are, respectively, disposed on side surfaces, which are opposite to each other, of the housing member 50. The sight glass 60 is disposed on a side surface, on which neither the first and second connection members 51, 52 are not disposed, of the housing member 50.

Figure 10:
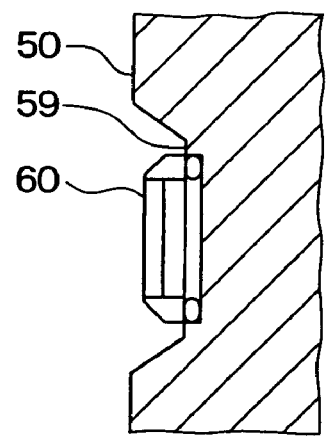
FIG. 10 is a partial cross sectional view of a surface to which a sight glass is to be attached, the sight glass being shown FIG. 9.

As shown in FIG. 10, a concave member 59 is formed or disposed on the side surface of the housing member. The sight glass 60 is mounted to or installed to the concave member 59.

In the above-described configuration, the connector case 10, the sight glass 60, the first connection member 51, the second connection member 52 and the charging valve 70 are disposed on different surfaces of the housing member 50, and therefore, a dimension of the pressure sensor is reducible.

Moreover, since the sight glass 60 is mounted to or installed to the concave member 58 of the housing member 50, it is possible to configure the pressure sensor such that the sight glass 60 is not stick-out form the housing member 50.

Other Embodiments

According to each of the first, second, third, fourth, seventh embodiments, both of the sight glass 60 and the charging valve 70 are mounted to the housing member 50, to which the connector case 10 is mounted. Alternatively, one of or none of the sight glass 60 and the charging valve 70 may mounted to the housing member 50.

According to the above embodiments, the connector case 10 and the sight glass 60 are fixed to the housing member by crimping. Alternatively, another way may fix the connector case 10 and the sight glass 60 to the housing member 50.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A pressure sensor comprising:
a case;
a detection unit attached to one end of the case;
a housing member having a first surface, a first connection member, a second connection member, a passage, a pressure introduction hole and a second surface on which a first opening member is disposed, wherein the first surface of the housing member is coupled with the one end of the case;
a diaphragm fixed to the housing member so as to cover the detection unit; and
a sight glass for providing visible recognition of the cooling medium,
the sight glass installed to the first opening member of the housing member,
wherein
the first and second connection members are connectable with a pipe in which a cooling medium flows,
the passage connects the first connection member with the second connection member,
the pressure introduction hole introduces a pressure of the cooling medium to the diaphragm from the passage, and
the detection unit is capable of detecting the pressure of the cooling medium introduced from the first and second connection members through the passage and the pressure introduction hole, the pressure being applied to the diaphragm and transmitted to the detection unit.

2. The pressure sensor according to claim 1, wherein the first and second surfaces of the housing member are a same surface.

3. The pressure sensor according to claim 1, wherein the first surface of the housing member is disposed opposite to the second surface of the housing member.

4. The pressure sensor according to claim 1, further comprising:
a valve core for introducing and discharging the cooling medium, wherein
the housing member further includes a third surface, on which a second opening member is disposed,
the valve core is installed to the second opening member of the housing member, and
the valve core with the second opening member of the housing member provides a charging valve.

5. The pressure sensor according to claim 4, wherein the second and third surfaces of the housing member are a same surface of the housing member.

6. The pressure sensor according to claim 4, wherein the second and third surfaces of the housing member are a same surface of the housing member, and
the first surface of the housing member is disposed opposite to the second surface of the housing member.

7. The pressure sensor according to claim 4, wherein the case, the charging valve, the first connection member, the second connection member and the sight glass are disposed on different surfaces of the housing member, respectively.

8. The pressure sensor according to claim 4, wherein the housing member has an almost six-sided prism shape, and
the case is disposed on one of a top surface and a bottom surface of the housing member.

9. The pressure sensor according to claim 4, wherein:
the housing member has an almost six-sided prism shape; and
the case, the first connection member, the second connection member, the sight glass and the charging valve are disposed on different surfaces of the housing member, respectively.

10. A pressure sensor comprising:
a case;
a detection unit attached to one end of the case;
a housing member having a first surface, a first connection member, a second connection member, a passage, a pressure introduction hole and a second surface on which an opening member is disposed, wherein the first surface of the housing member is coupled with the one end of the case, wherein the first and second connection members are connectable with a pipe in which a cooling medium flows;
a diaphragm fixed to the housing member so as to cover the detection unit; and
a valve core for introducing and discharging the cooling medium, the valve core installed in the opening member of the housing member,
wherein
the passage connects the first connection member with the second connection member,
the pressure introduction hole introduces a pressure of the cooling medium to the diaphragm from the passage,
the detection unit is configured to detect the pressure of the cooling medium introduced from the first and second connection members through the passage and the pressure introduction hole, the pressure being applied to the diaphragm and transmitted to the detection unit, and
the valve core with the opening member of the housing member provides a charging valve.

11. A pressure sensor comprising:
a case;
a detection unit attached to one end of the case;
a housing member configured to include a coupling surface coupled to the one end of the case, a first connection member and a second connection member each connectable to a pipe in which a cooling medium flows and connected to one another through a passage, a pressure introduction hole located within the passage, and a sight glass for providing visible recognition of the cooling medium in the passage; and
a diaphragm fixed to the housing member to cover the detection unit and configured to receive a pressure of the cooling medium applied to the diaphragm through the pressure introduction hole, and to transmit the applied pressure to the detection unit.

* * * * *